March 12, 1957 M. ARTZT 2,785,039

FACSIMILE RECORDING APPARATUS

Filed Nov. 8, 1952

INVENTOR.
MAURICE ARTZT

BY [signature]
ATTORNEY

United States Patent Office 2,785,039

Patented Mar. 12, 1957

2,785,039

FACSIMILE RECORDING APPARATUS

Maurice Artzt, Princeton, N. J., assignor, by mesne assignments, to the United States of America as represented by the Secretary of the Army Application November 8, 1952, Serial No. 319,526

3 Claims. (Cl. 346—74)

The present invention relates to facsimile recording apparatus of the type employing carbon paper printing.

More particularly, this invention relates to facsimile recorders of the above-designated variety in which the printing pressure is generated directly by electromagnetic forces rather than through the agency of mechanical means.

Magnetically driven stylus pressure recorders, for example, have heretofore been employed in facsimile, as shown by the patents to Artzt 2,145,285 granted January 31, 1939, and to Charles J. Young 1,848,862, granted March 8, 1932, and its Reissue 20,152, issued October 27, 1936. In known types of magnetically driven pressure recorders, electromagnetic forces are applied to the active printing member (e. g. stylus) by means of suitable linkages connecting the magnet to the printer member. Such mechanically linked arrangements, of course, require extreme precision of lineup between the parts in order for proper matching of the printing members to be realized.

It is, therefore, a primary object of the present invention to provide means for magnetically generating printing pressures in a carbon paper type facsimile recorder wherein no mechanical linkages are required for transmitting the magnetic force to the printing member.

In general, the present invention contemplates the furnishing of printing pressure in a carbon paper type recorder through the agency of a "free floating" printing member (e. g. printer bar or stylus) which is a part of a magnetic circuit, so that the active member is free to ride on the paper at all times. Through the application of magnetic forces, the stylus or other member is attracted to the drum to generate pressure at the printing point against the carbon paper and recording paper which are carried between the stylus and drum, for example.

Thus, it is another object of the present invention to provide a facsimile recorder wherein the printing members themselves constitute part of a magnetic circuit.

Another object of the present invention is the provision of means whereby printing pressures are generated only at the printing point. Persons skilled in the art will appreciate the fact that this arrangement results in a greater speed of response of the printing member, with substantially no rebound, thus eliminating the necessity for mechanical damping means commonly found in the prior art.

A further object is that of providing a pressure type recording apparatus in which the printing pressure is constant for any point along the entire length of the scanning line.

Other objects and advantages of the present invention will become apparent to persons skilled in the art from a study of the following detailed description of the drawings in which.

Figures 1, 2, 3, 4, 5:
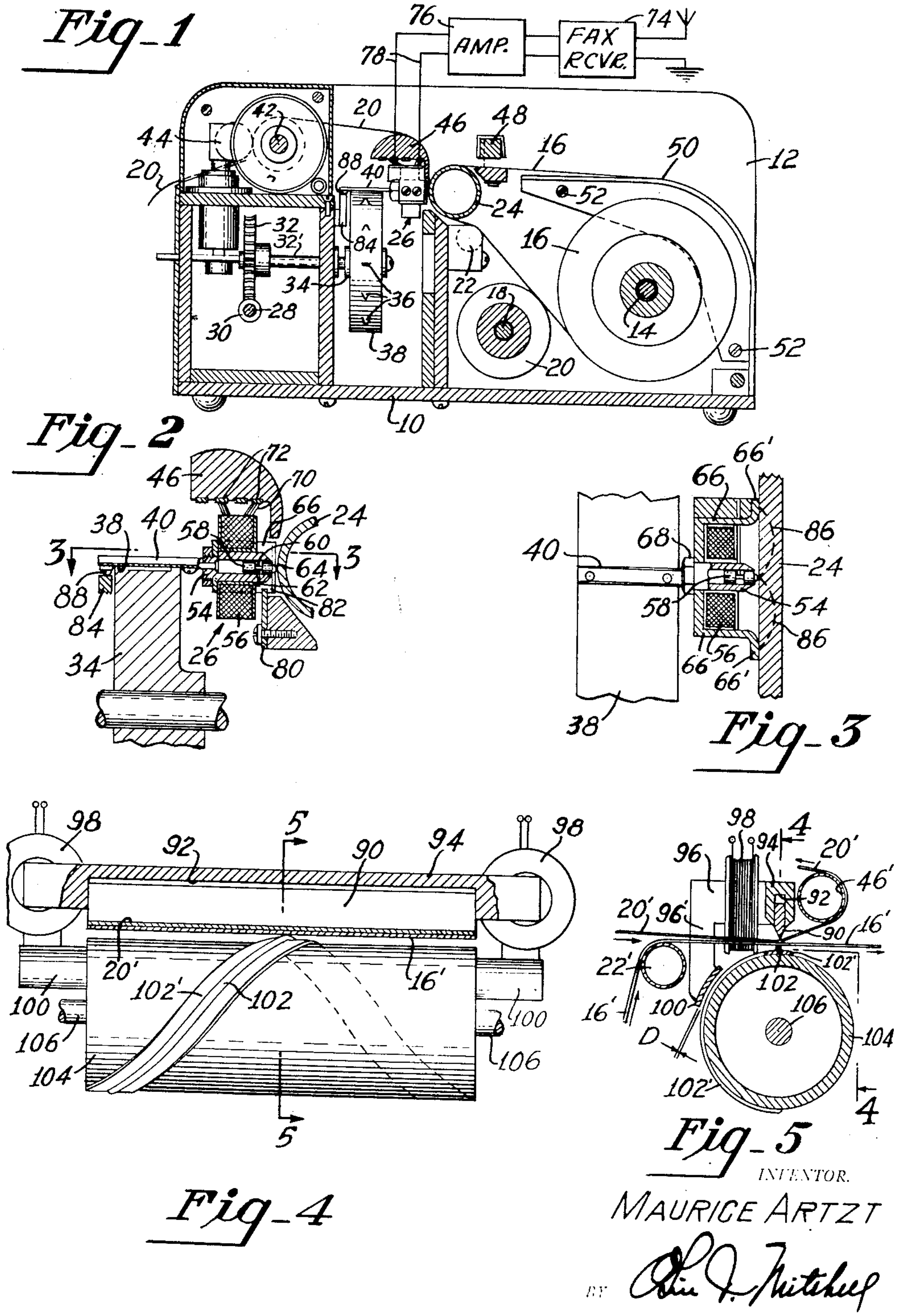
Fig. 1 is a vertical sectional view of a complete facsimile recording apparatus embodying the present invention.
Fig. 2 is a detailed view of a portion of Fig. 1.
Fig. 3 is a sectional view taken along line 3—3 of Fig. 2.
Fig. 4 illustrates, by way of vertical elevation, another embodiment of the present invention.
Fig. 5 is a sectional view along line 5—5 of Fig. 4.

Referring to the drawings and, for the present, to Fig. 1 thereof, there is shown by way of a vertical sectional view, a complete facsimile recording apparatus embodying the present invention. Mounted on a base 10 are side walls 12 which carry, in suitable journals, a shaft 14 on which is supported a recording paper supply roll 16. Similarly supported by means of shaft 18 is a roll of carbon paper 20. The carbon paper and recording paper are carried over an idler guide member 22 and around a portion of the periphery of a steel idler platen or roller 24. Reference numeral 26 indicates generally a stylus printing member assembly shown in operative position with respect to the platen 24 such that the carbon paper 20 and recording paper 16 pass around the platen 24 between it and the stylus member 26. A motor (not shown) is provided for rotating a shaft 28 which carries a worm gear 30. The worm gear meshes with and drives a large gear 32 which, in turn, is keyed to a shaft 32' which carries a drive sprocket wheel 34 having sprocket teeth 36 for engaging apertures in a belt 38. The stylus assembly 26 is secured to the belt 38 by means of an extension 40 of the stylus assembly. A carbon paper feed roll 42 is also driven through the agency of suitable gearing (not shown) which is drivingly connected to the motor shaft 28. A depressor roll 44 is mounted adjacent the feed roll 42 and maintains frictional contact between the latter and the used carbon 20. Also provided in the apparatus is a carbon paper guide member 46 over which the used carbon travels on its way to the drive roll 42. A cutting knife 48 is adapted to slice across the recorded copy when desired so that the copy is free to be removed from the receiving apron 50 disposed at the front end of the apparatus and supported by the side walls 12 as by means of bolts 52.

As shown more clearly in Figs. 2 and 3, the stylus assembly 26 comprises a magnetic core 54 of iron or steel around which is wound an electromagnetic coil 56. As illustrated, the core 54 is hollow and receives slidably a moveable stylus member 58 which has a reduced central portion 60. Axial movement of the stylus 58 is limited in both directions by means of a stop member 62 which may be in the form of a pin or length of wire extending into the hollow portions of the core 54 between the enlarged end portion of the "dumbbell"-shaped stylus 58. The stylus 58 also includes a printing point 64 which may be a steel ball or sapphire point pressed into its end adjacent the steel platen 24. Also supported by the magnetic core 54 is a return flux pole piece 66 which is generally U-shaped and held in position on the core 54 by means of a nut 68 which engages a threaded portion of the core extending through an opening in the bight of the U. Current for the coil 56 is supplied through brushes 70 which engage contact bars 72, the latter being supported on the underside of the carbon paper guide member 46.

As persons skilled in the art will understand, current proportional to the facsimile signal received by a receiver 74 and amplified at 76 may be applied through leads 78 to the contact bars 72 so that the coil 56 may be energized accordingly. The stylus assembly 26 is guided during its travel across the axial length of the platen 24 a front guide strip 80 which is received in a suitable slot 82 in the return flux poles 66. The stylus assembly 26 is also supported and guided at its rear end by a guide piece 84 on which a suitable low friction button 88 projecting from the stylus shank 40 is adapted to ride.

When the coil 56 is energized by means of current passed therethrough, a magnetic circuit is established which includes the core member 54, stylus 58 and that portion of the steel platen 24 which is between the ends 66' of the return flux pole pieces 66. The ends 66' of the poles are turned outwardly, as indicated, in order to provide for a greater area for the return path of the magnetic flux which is indicated diagrammatically by the dotted lines 86. Thus it is seen that energization of the coil 56 causes the stylus 58 to be attracted magnetically into engagement with the carbon paper 20 which passes between the tip 64 of the stylus and the steel platen 24. Normally, in the absence of current in the coil 56, the stylus 58 will "float" freely along the surface of the carbon paper 20 with insufficient pressure thereon to cause marking of the record receiving paper 16. When current is applied, however, the stylus 58 which is a part of the magnetic circuit as above described, will be attracted to the steel platen 24 with an amount of force which is proportional to the magnitude of the current passing through the coil 56. In this manner, therefore, it is possible by means of the present invention to produce markings on the record paper 16 ranging from light gray for a small amount of current to black for a greater current flow. Since the printing pressure is applied only at the printing point 64 of the stylus, only a small amount of motion thereof is necessary, thus providing an extremely high speed of response with substantially no mechanical rebound of the stylus. The fact that the printing point 64 floats freely at all times on the surface of the carbon paper 20 obviates the necessity for the accurate mechanical lineup which is required in prior art devices.

By way of further illustration, the dimensional and operational characteristics of one operative embodiment of this invention are set forth below:

For a stylus 58 of 0.125″ dia. the cross section area is $A=0.0793$ cq. cm.

With the ball point 64 extending out 0.012″, and assuming a combined carbon and white paper thickness of 0.003″, the air gap of the stylus will be 0.015″, or 0.0381 cm.

The reluctance of the stylus working gap is therefore:

$$R_s=\frac{.0381}{.0793}=0.48 \text{ Oersted}$$

The return gaps (both sides in parallel) have a combined area of 1.6 sq. cms. and the working gap averages 0.075 cm. (.030″). The return gap reluctance is:

$$R_r=\frac{.075}{1.6}=0.047 \text{ Oersted}$$

Total air gap reluctance is therefore $$R_0{}^1=R_s+R_r=0.527 \text{ Oersted}$$

The iron path will bring this to a total reluctance of approximately $R_0=0.6$ Oersted.

With a current of 50 ma. in 5000 turns of coil 56, the magnetomotive force is:

$$Mmf.=4\pi NI=4\pi\times 5000\times\frac{.05}{10}=314 \text{ gilberts}$$

The total flux established will be:

$$\phi=\frac{314}{R_0}=\frac{314}{0.6}=523 \text{ Maxwells}$$

The force on the stylus will therefore be:

$$F=\frac{\phi^2}{8\pi A}=\frac{523^2}{8\pi\times .0793}=137{,}500 \text{ dynes}$$

This force in pounds is $$F_p=\frac{137{,}500}{444{,}823}=0.31 \text{ lb. printing pressure}$$

This pressure is obtained with a maximum flux density in the stylus of $$B=\frac{523}{.0793}=6600 \text{ lines/sq. cm. or } 42{,}500 \text{ lines/sq. inch}$$

The above flux density is actually only about 60% of the value which may be realized with ordinary iron. Thus, it will be appreciated that the density may be increased to 1.67 times this value if additional pressure is deemed desirable. With such increased density the pressure would accordingly be increased to 0.86 pound and the required current would become 83.3 ma.

It should be noted, moreover, that the low air gap reluctance $R_r$ of the return path is effectively in series with the working gap reluctance $R_s$ between the stylus 58 and the platen 24. Thus, as those skilled in the art will appreciate, the efficiency of the magnetic circuit is extremely high.

In order for the paper feed of this apparatus to be continuous, a plurality of stylus assemblies 26 may be mounted along the length of the sprocket belt 38, the spacing between styli being equal to the width of a scanning line. Current for each of the styli may be derived through brushes such as those shown in Fig. 2 at 70 in cooperation with the contact bars 72, so that each stylus will be commutated into the recorder circuit as it reaches the upper run of the belt 38 and is in position for scanning.

The principle illustrated above, namely that of employing an electromagnetic attraction for a printing member wherein both members of a carbon printing arrangement are part of a magnetic circuit, is also applicable to the "bar-helix" type of equipment such as is illustrated in Figs. 4 and 5.

Specifically, a printer bar 90 is slidably received in a slot 92 which extends along the length of a core piece 94 of iron, for example. The core piece 94 is provided at each end with a rearwardly extending member 96 on which is wound an electromagnetic coil 98. The members 96 have associated therewith downwardly extending portions 96' which are joined at their bottom extremities by means of a pole piece or shoe 100. The printer bar 90 is adapted to float freely on the helical wire 102 which is supported by a drum 104, the latter being fashioned of aluminum or other non-magnetic material. The helix shown at 102 may, in fact, comprise an iron strip 102' wrapped around drum 104 in the form of a helix, a groove being provided centrally of the strip 102' to accommodate a length of piano wire, for example, which projects slightly beyond the outer surface of the strip 102' to form a fine helical printing surface.

The drum 104 is, as illustrated, mounted for rotation on a shaft 106. A web of record receiving paper 16' is adapted to be fed from a supply roll (not shown) over an idler guide roll 22' between the bottom edge of the printer bar 90 and the helix supporting drum 104 together with a web of carbon paper 20' which, after having passed between the printing members, travels around guide bar 46'.

The pole piece or shoe 100 is so mounted as to have a small air gap shown at "D" with respect to the helix 102 so that, when current is passed through the coils 98 (which are connected in parallel), a magnetic circuit is established which includes the core member 94, printer bar 90, helix strip 102, pole piece 100 and core members 96' and 96.

In operation, therefore, the printer bar 90 normally floats freely upon the surface of the carbon paper 20' and, upon the application of current to the coils 98, the printer bar 90 is attracted to the helix 102 with an amount of force proportional to the magnitude of current in the coil, thus resulting in a printing pressure against the carbon paper and record paper to produce markings on the record paper 16' whose degree of "blackness" is a function of the current magnitude. As was the case with the stylus type of printer described above, the fact that the printer bar 90 is "free floating" at all times means that no stringent precautions need be taken in lining up the bar with respect to the helix. Although not shown, suitable means for limiting the movement of the printer bar 90 with respect to the core piece 94 may be provided.

Having thus described my invention, what I claim as new and desire to secure by Letters Patent is:

1. A recording apparatus which comprises: a magnetic core member having a bore therein; an electromagnetic coil around said core; a printing member of magnetizable material slidably supported in said bore; a roller platen of magnetic material adapted to serve as a backing for a record-receiving sheet and a pressure-sensitive printing sheet; said printing member being free to float on said sheets in the absence of current in said coil; a pole shoe projecting from said core and extending to within a short distance from said roller; and means for passing current through said coil thereby establishing a magnetic field through said core, printing member and roller, said pole shoe having a large area facing said roller, whereby to provide a low reluctance return path for magnetic flux from said roller to said core.

2. A recording apparatus as defined by claim 1 wherein said return path is in series with the flux path from said printing member to said roller.

3. A recording apparatus as defined by claim 2 wherein the area of said printing member facing said roller is substantially smaller than the area of said pole shoe.

References Cited in the file of this patent

UNITED STATES PATENTS

| | | |
|---|---|---|
| 1,673,209 | Semat | June 12, 1928 |
| 1,689,267 | Weaver | Oct. 30, 1928 |
| 2,454,247 | Young | Nov. 16, 1948 |
| 2,591,138 | Cooley | Apr. 1, 1952 |

FOREIGN PATENTS

| | | |
|---|---|---|
| 422,691 | Germany | Dec. 9, 1925 |